No. 749,738. PATENTED JAN. 19, 1904.
H. W. LOCKE.
MEANS FOR ATTACHING SUPPLEMENTARY PARTS TO PHOTOGRAPHIC CAMERAS.
APPLICATION FILED NOV. 20, 1902.
NO MODEL. 2 SHEETS—SHEET 1.
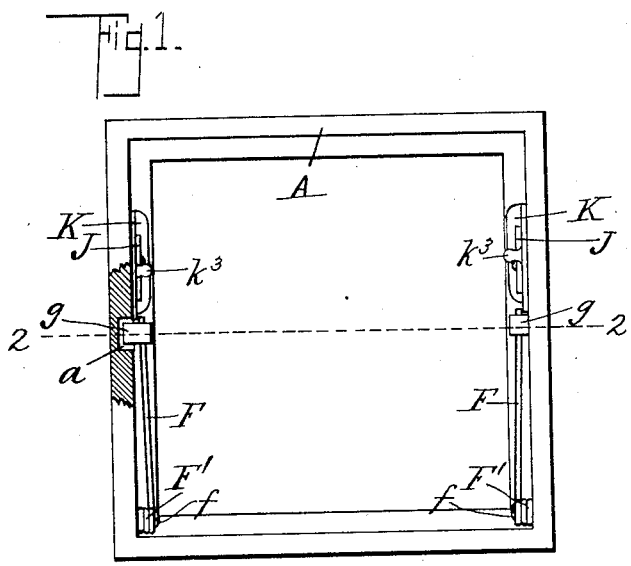
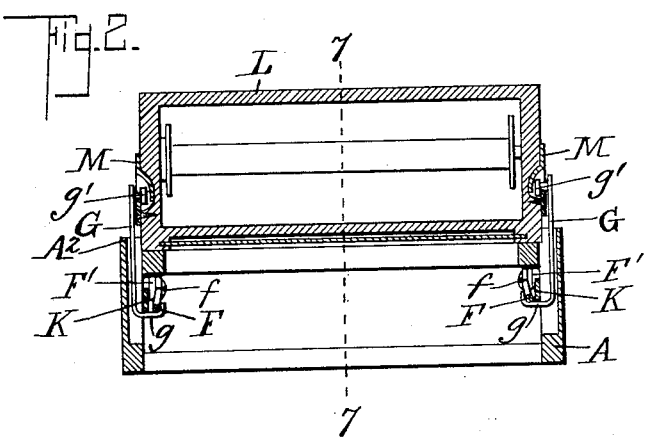
WITNESSES=
F. Bissell.
D. Gurnee.
INVENTOR=
Harry W. Locke
by Osgood & Davis
his Attys No. 749,738. PATENTED JAN. 19, 1904.
H. W. LOCKE.
MEANS FOR ATTACHING SUPPLEMENTARY PARTS TO PHOTOGRAPHIC CAMERAS.
APPLICATION FILED NOV. 20, 1902.
NO MODEL. 2 SHEETS—SHEET 2.
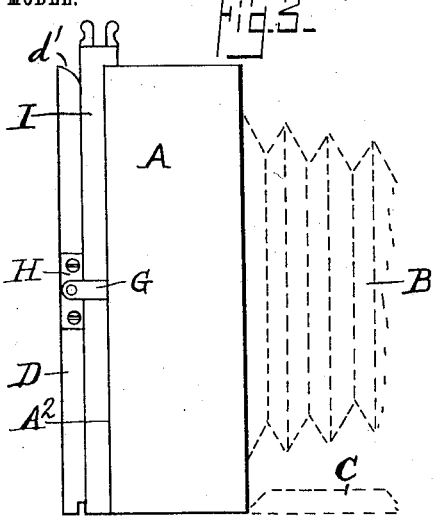
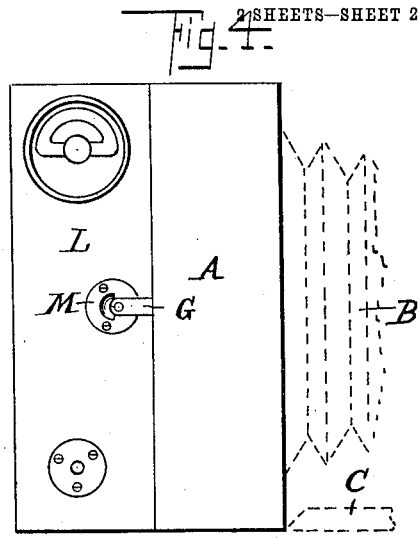
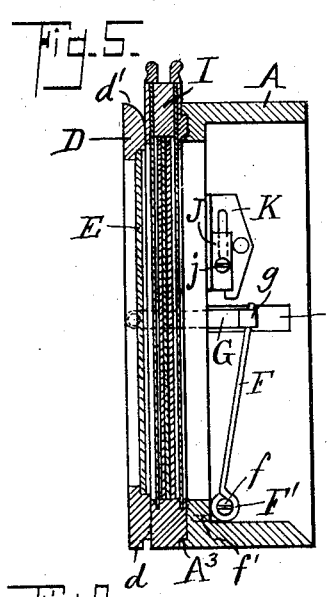
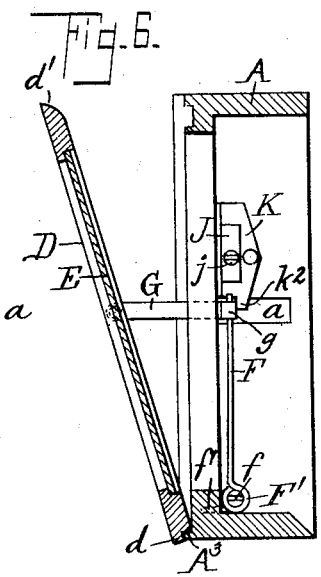
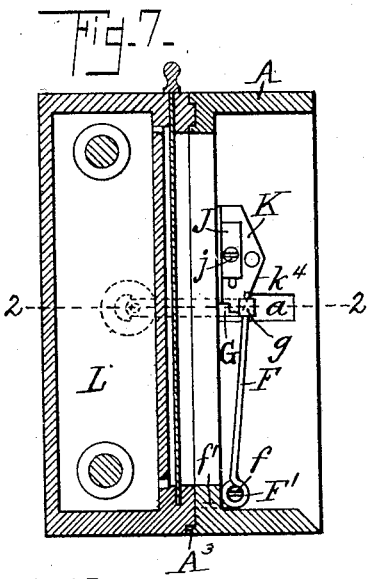
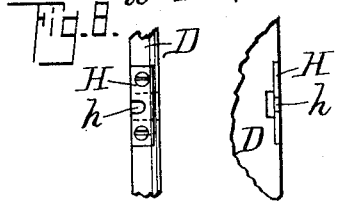
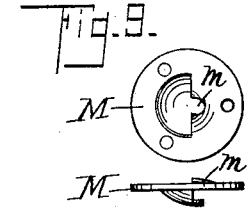
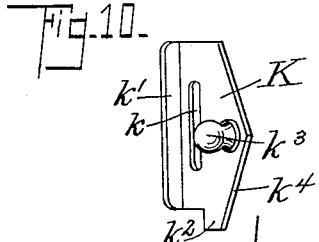
Witnesses:
F. Bissell
L. Gurnee
Inventor:
Harry W. Locke
by Osgood & Davis
his Attys No. 749,738. Patented January 19, 1904.

UNITED STATES PATENT OFFICE.

HARVEY W. LOCKE, OF ROCHESTER, NEW YORK, ASSIGNOR TO CENTURY CAMERA COMPANY, OF ROCHESTER, NEW YORK, A CORPORATION OF NEW YORK.

MEANS FOR ATTACHING SUPPLEMENTARY PARTS TO PHOTOGRAPHIC CAMERAS.

SPECIFICATION forming part of Letters Patent No. 749,738, dated January 19, 1904.

Application filed November 20, 1902. Serial No. 132,093. (No model.)

*To all whom it may concern:*

Be it known that I, HARVEY W. LOCKE, a citizen of the United States, and a resident of Rochester, in the county of Monroe and State of New York, have invented certain new and useful Improvements in Means for Attaching Supplementary Parts to Photographic Cameras, of which the following is a specification.

This invention relates to means for attaching supplementary parts to photographic cameras. Its object is to provide means for attaching to the back of the camera-box a detachable supplementary part, such as a single or magazine holder for negatives, or a focusing device, or a camera-back.

In the drawings, Figure 1 is a front view of a camera-box, parts being broken away to show construction. Fig. 2 is a cross-section on the line 2 2 of Fig. 1. Fig. 3 is a side elevation of the camera-box, showing a plate-holder attached thereto. Fig. 4 is a side elevation of the camera-box, showing a roll-holder attached thereto. Fig. 5 is a central vertical section of the camera-box and plate-holder shown in Fig. 3. Fig. 6 is a like central vertical section with the camera-back pulled out in readiness to receive a plate-holder. Fig. 7 is a central vertical section on the line 7 7 of Fig. 2. Figs. 8 and 9 embody each an enlarged plan and an edge view of the socket-plates, and Fig. 10 is an enlarged perspective view of the slide of one of the locking devices.

A is a camera-box of suitable construction. A bellows B and a bed C (in this case shown as a drop-front) are indicated in dotted lines in Figs. 3 and 4. A camera-back closes the back end of the camera-box and in the present case is shown as a frame D, containing a focusing-screen E, of ground glass or of other suitable material. The frame D is held firmly against the back of the box by suitable means hereinafter described, and in order to secure a snug or light-tight fit the edge of the camera-box may be suitably rabbeted, as indicated at $A^2$ and $A^3$, and the lower edge of the frame D may also be rabbeted to fit upon the lower projecting edge $A^3$ of the camera-box.

The screen-frame or camera-back D may be employed to hold a plate-holder against the back of the camera-box. Spring-operated arms G slide in guideways $a$ in the sides of the camera-box, so as to be extended from the back of said box or to be retracted within the same, and said arms have means for connecting them with the detachable supplementary part, which in the present instance is the frame D. For this purpose projections or pins $g'$, Fig. 2, are provided on the outer ends of said arms, which are adapted to engage in notches or sockets $h$ in plates H, secured to the edges of the frame D, as shown most clearly in Figs. 3 and 8. Springs are provided for acting on said arms to press the supplementary part and the camera-box together. In the present embodiment of the invention the springs are not integral with the arms G; but the free ends of the springs F engage in hooks or sockets $g$ on the inner ends of the arms G, and said springs have suitable bearings in the camera-box, being coiled around or having bearing against a screw $f$ and having ends $f'$ bearing in or against said camera-box. The springs tend to retract the arms G into the camera-box by moving said arms along in the guideways $a$, thus causing and permitting movement of said arms preferably substantially at right angles to the back of the camera-box and pulling the frame D or other supplementary part firmly against said back and at the same time preventing lateral movement of such supplementary part because of the engagement of the projections on the arms G in the notches in the socket-plates on said supplementary part in two lateral directions and preventing lateral movement in the other two directions by reason of the arms G connecting with and lying against the outer edges of said supplementary part. Thus the arms G when engaged in the notches in the socket-plates compel a perfect registry of the rabbets or flanges on one of these parts with the edges, rabbets, or flanges on the other of these parts.

In the application of the invention shown in Figs. 3, 5, and 6 a double plate-holder I of the usual form is held against the back of the camera-box by the camera back or frame D. Other forms of negative-holders may of course be similarly employed. In order to attach the plate-holder I to the camera-box, the frame D is pulled backward away from the camera-box $a$, thereby extending the arms G and compressing the springs F. The upper edge of the screen-frame D is represented as beveled in order to give a better hold for producing this last operation and in order to facilitate the insertion of the plate-holder.

Means are provided for locking the arms G in either the extended or the retracted position. Locking devices, such as the slides K, (see Figs. 5, 6, 7, and 10,) are secured to the sides of the camera-box adjacent to the guideways $a$, so that said locking devices when moved intersect the line of movement of the arms G. The slides K (shown most clearly in Fig. 10) are conveniently formed as L-shaped plates to fit in a corner in the interior of the camera-box, and each plate has a slot $k$ and a handle $k^3$. The plates are held to the camera-box by a guide-plate J and a screw or pin $j$, passing through said guide-plate and through said slot $k$ and into the camera-box. Each locking device or slide K has a projecting point $k^2$ on one end and a diagonal or wedge surface $k^4$. When the arm G is extended, the positions of the parts are such that the projecting point $k^2$ may be moved across the inner end of the arm G, as shown in Fig. 6, thus holding said arm in the extended position, and when the arm G is retracted into the box in the position shown in Fig. 5 or Fig. 7 and the locking device or slide K is moved downward the diagonal or wedge surface $k^4$ acts against the inner surface of the projection or hook $g$ and on being forced downward presses the arm G inwardly, tending to retract said arm into its guideway $a$, and thus constitutes means for pressing said supplementary part and said camera-box together, besides having the locking functions described. The springs F may be omitted and the device is still effective for fastening the camera-box and the supplementary part together. The plate-holder I when inserted between the frame D and the back of the camera-box is thus firmly clamped with proper registry against the back of the camera-box.

In Figs. 2, 4, and 7 a magazine negative-holder is shown, having in this instance a roll-holder of usual form. When this roll-holder is used, it is provided on its opposite sides with socket-plates of suitable form, such as that shown in Fig. 9, which is a metallic plate M, having a recess into which the projection or pin $g$ may extend and a notch $m$ as a socket for said projection or pin. The camera back or frame D is pulled out into the position shown in Fig. 6, and the locking devices K are slid downward, so as to hold the arms G in the extended position. The frame D is then detached from said arms and the roll-holder L is connected to them. The locking devices K are moved so as to release the arms G, and the springs F pull the roll-holder against the back of the camera-box, and then the locking devices are moved again so as to press and lock the roll-holder firmly against the back of the camera-box with exact registry of the flanges, rabbets, or edges of the supplementary part with the other part—the camera-box.

What I claim is—

1. The combination of a camera-box as one part; a detachable supplementary part substantially of the character described; arms detachably pivoted to one of the parts and sliding in guideways in the other of the parts and thereby adapted to be extended from and retracted on said part; and means acting on said arms for pressing said supplementary part and the camera-box together.

2. The combination of a camera-box as one part; a detachable supplementary part substantially of the character described; arms detachably pivoted to one of the parts and sliding in guideways in the other of the parts and thereby adapted to be extended from and retracted on said part; and a sliding catch adapted to engage said arms to retain them in their extended positions.

3. The combination of a camera-box as one part; a detachable supplementary part substantially of the character described; arms detachably pivoted to one of the parts and sliding in guideways in the other of the parts and thereby adapted to be extended from and retracted on said part; and a sliding catch adapted to engage said arms and retain them both in their extended and retracted positions.

4. The combination of a camera-box as one part; a detachable supplementary part substantially of the character described; arms detachably pivoted to one of the parts and sliding in guideways in the other of the parts and thereby adapted to be extended from and retracted on said part; sliding catches adapted to engage said arms, respectively, to retain them in their extended positions, each catch having a wedge that is adapted to engage one of said arms so as to press and lock said supplementary part upon said camera-box.

HARVEY W. LOCKE.

Witnesses:
  F. BISSELL,
  D. GURNEE.